United States Patent Office 3,816,451
Patented June 11, 1974

3,816,451
MALEIMIDE DERIVATIVES AS PLANT
GROWTH REGULATORS
Aldo Joseph Crovetti, Lake Forest, and Donald Murl
Lynch, Waukegan, Ill., assignors to Abbott Laboratories, North Chicago, Ill.
No Drawing. Filed Nov. 2, 1971, Ser. No. 199,393
Int. Cl. C07d 27/18
U.S. Cl. 260—326.5 FM                     21 Claims

ABSTRACT OF THE DISCLOSURE

Covers maleimide derivatives having the following general formula:

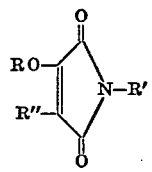

where R is selected from the group consisting of alkyl, benzyl, naphthyl, phenyl, and substituted phenyl, R' is selected from the group consisting of hydrogen, phenyl and substituted phenyl and R" is selected from the group consisting of halo and RO.

Also covers the method of employing the just described derivatives as plant growth regulators. Specifically, covers the method of their use as herbicides.

BACKGROUND OF THE INVENTION

Considerable research effort has been expended in developing compounds which are useful in influencing the growth and development of a wide variety of plants. One of the primary aims in such endeavors is to develop a series of compounds which has a wide spectrum of activity. For example, continuing efforts are being carried out to synthesize compounds, which on one hand can beneficiate plants, and on the other hand can eradicate undesirable plant species. Such benefication or eradication will be dependant upon the type of plant treated, dosages employed, and other factors. Thus, as an example it would be a considerable advance in the art if a series of compounds were discovered which is useful as herbicides to destroy unwanted weeds, and likewise could benefit useful plants by regulating growth.

It therefore becomes object of the invention to provide a novel class of compounds which influence the growth and development of a wide variety of plant species.

A more specific object of the invention is to provide the above series of compounds which exhibit herbicidal activity with respect to noxious weeds.

Other objects will appear hereinafter.

SUMMARY OF THE INVENTION

In accordance with the invention a new class of maleimide compounds has been discovered. These maleimide derivatives have the following general formula:

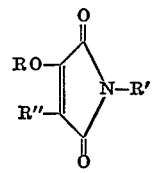

where R is selected from the group consisting of alkyl, benzyl, naphthyl, phenyl, and substituted phenyl, R' is selected from the group consisting of hydrogen, phenyl and substituted phenyl and R" is selected from the group consisting of halo and RO.

The invention here is also concerned with the use of the above compounds as plant growth regulators. More specifically, the above compounds can be used to eradicate noxious weeds by application thereof.

DETAILED DESCRIPTION OF THE INVENTION

In more detail the compounds just described in a preferred embodiment have the following structural formula:

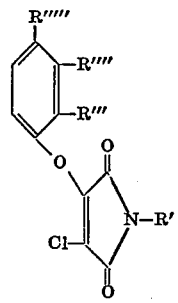

where R'" is selected from the group consisting of hydrogen, halo, R' is selected from the group consisting of hydrogen, phenyl and substituted phenyl, R"" is selected from the group consisting of hydrogen, halo and lower alkyl and R""' is selected from the group consisting of hydrogen, halo, lower alkylthio, and nitro.

One class of compounds which have found excellent utility as herbicides are 2-alkyl or aryl-oxy-3-chloromaleimides having the following general structural formula:

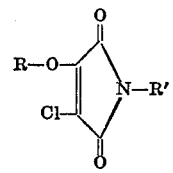

wherein R is selected from the group consisting of alkyl, phenyl, substituted phenyl, naphthyl, and benzyl, and R' is selected from the group consisting of hydrogen, phenyl and substituted phenyl.

Yet another preferred class of compounds falling within the scope of the invention have the following general structural formula:

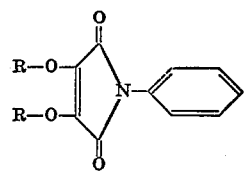

wherein R is selected from a group consisting of alkyl, phenyl, substituted phenyl and benzyl.

The 2-alkyl or aryl-oxy-3-chloro-N-phenylmaleimides are prepared by reacting an alcoholic salt such as the sodium salt of phenol with N-phenyl-dichloromaleimide in a mole to mole ratio. The following general reaction sequence and procedure is typical here.

(a) $\text{ROH} + \text{NaH} \xrightarrow{\text{solvent}} \text{RONa}$ (b)
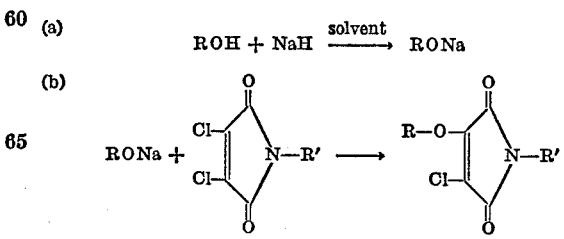

To a stirred suspension of sodium hydride in a solvent such as dioxane is added an alcohol such as phenol. A slight excess of sodium hydride is normally employed. The resultant, salt is then added in a mole to mole ratio to N-phenyl-dichloromaleimide solubilized in a solvent such as dioxane. The mixture is then stirred at room temperature overnight, concentrated under vacuum, and diluted with water. If the resultant product is solid it may be removed by filtration, washing with water and recrystallization. If an oil in obtained the aqueous phase is normally decanted and the product dissolved in chloroform, washed with water and dried over a dessicant such as magnesium sulfate. Thereafter, the solvent is evaporated and the residue triturated under ether to give a solid that may be recrystallized from a number of solvents such as benzene, hexane, ethanol, ether, etc.

To prepare the 2,3-bis(aryloxy)-N-phenyl-maleimides the same procedure is employed as just described with the exception that 2 moles of sodium hydride and 2 moles of alcohol are employed per mole of imide.

EXAMPLE I 2-chloro-3-phenoxymaleimide and 2-chloro-3-methoxymaleimide

To a stirred, ice-cooled solution of 12.44 g. (0.075 mole) of dichloromaleimide in 100 ml. of methanol was added dropwise over a period of 1½ hours a solution of 7.05 g. (0.075 mole) of phenol and 3.0 g. (0.075 equivalent) of sodium hydroxide in 100 ml. of methanol. The mixture was allowed to come to room temperature overnight with stirring. The solution was then diluted with 500 ml. of water acidified with 10% hydrochloric acid and chilled to 4° C. This gave 1.82 g. of a solid product having a melting point of 114–116° C. Recrystallization from of benzene-Skellysolve B afforded 1.35 g. of 2-chloro-3-phenoxymaleimide as amber crystals, having a melting point of 115–117° C.

Concentration of the filtrate from the above with chilling to 4° C. gave 4.43 g. of crude solid. Crystallization from a mixture of benzene and Skellysolve B afforded 1.89 g. of product having a melting point of 163–165° C. Recrystallization from benzene gave 2-chloro-3-methoxymaleimide as pale yellow crystals having a melting point of 165–167° C.

The 2-chloro-3-phenoxymaleimide having the formula $C_{10}H_6ClNO_3$ was then analyzed as follows:

| | Percent | | | |
|---|---|---|---|---|
| | Carbon | Hydrogen | Chlorine | Nitrogen |
| Found | 53.83 | 2.74 | 16.18 | 6.23 |
| Calculated | 53.71 | 2.71 | 15.85 | 6.26 |

The 2-chloro-3-methoxymaleimide having the formula $C_5H_4ClNO_3$ was analyzed as follows:

| | Percent | | | |
|---|---|---|---|---|
| | Carbon | Hydrogen | Chlorine | Nitrogen |
| Found | 37.31 | 2.44 | 21.91 | 8.78 |
| Calculated | 37.17 | 2.50 | 21.95 | 8.67 |

EXAMPLE II 2-chloro-3-(4-chlorophenoxy)-N-phenylmaleimide

To a stirred suspension of 3.82 g. of 57% sodium hydride oil dispersion (2.18 g. sodium hydride, 0.091 mole) in 50 ml. of dioxane was added dropwise to 10.8 g. (0.084 mole) of p-chlorophenol dissolved in 150 ml. of dioxane, over a period of 50 minutes. The mixture was stirred for 15 minutes and then added dropwise over a period of 40 minutes with stirring to 20.0 g. (0.083 mole) of N-phenyldichloromaleimide in 100 ml. of dioxane. The mixture was stirred at room temperature over night, concentrated in vacuo, and then diluted with water. This gave a crude, tan solid that was removed by filtration and recrystallized from 95% ethanol to give 15.19 g. of light yellow crystals having a melting point of 137–140° C.

The above compound had a formula of $C_{16}H_9Cl_2NO_3$ and analyzed as follows:

| | Percent | | | |
|---|---|---|---|---|
| | Carbon | Hydrogen | Chlorine | Nitrogen |
| Found | 57.53 | 2.70 | 21.14 | 4.22 |
| Calculated | 57.51 | 2.72 | 21.22 | 4.19 |

EXAMPLE III 2-chloro-3-(2,4-dichlorophenoxy)-N-phenylmaleimide

To a stirred suspension of 3.82 g. of 57% sodium hydride oil dispersion (2.18 g. sodium hydride, 0.091 mole) in 50 ml. of dioxane was added dropwise over a period of one hour, 13.16 g. (0.084 mole) of 2,4-dichlorophenol dissolved in 100 ml. of dioxane. The mixture was stirred for 15 minutes and added dropwise while stirring over a period of 40 minutes to 20.0 g. (0.083 mole) of N-phenyldichloromaleimide in 100 ml. of dioxane. The mixture was stirred at room temperature overnight, concentrated in vacuo, and diluted with water. This gave an oil that was extracted with chloroform. The chloroform extract was washed with water, dried over magnesium sulfate, filtered, and concentrated in vacuo Trituration under ether gave 21.63 g. of a white solid. Crystallization from 95% ethanol afforded 20.1 g. of crystals having a melting point of 109–111° C.

The above compound having the formula $C_{16}H_8Cl_3NO_3$ analyzed as follows:

| | Percent | | | |
|---|---|---|---|---|
| | Carbon | Hydrogen | Chlorine | Nitrogen |
| Found | 52.22 | 1.95 | 28.39 | 3.81 |
| Calculated | 52.13 | 2.19 | 28.86 | 3.80 |

A number of other 2-alkyl or aryl-oxy-3-chloromaleimides were prepared according to the just described procedures. These compounds have the following general structural formula:

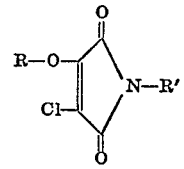

where R is selected from the group consisting of alkyl, napthyl, phenyl, substituted phenyl and benzyl, and R' is selected from the group consisting of hydrogen, phenyl and substituted phenyl.

TABLE I

| Example number | R | R' | M.P., °C. | Percent yield | Formula | Carbon Found | Carbon Calcd. | Hydrogen Found | Hydrogen Calcd. | Chlorine Found | Chlorine Calcd. | Nitrogen Found | Nitrogen Calcd. |
|---|---|---|---|---|---|---|---|---|---|---|---|---|---|
| IV | Ph | Ph | 130–132 | 46 | $C_{16}H_{10}ClNO_3$ | 63.90 | 64.12 | 3.36 | 3.36 | 12.18 | 11.83 | 4.62 | 4.67 |
| V | 3-ClPh | Ph | 111–114 | 66 | $C_{16}H_9Cl_2NO_3$ | 57.50 | 57.51 | 2.69 | 2.72 | 21.09 | 21.22 | 4.19 | 4.19 |
| VI | 2-$C_{10}H_7$ | Ph | 162–164 | 48 | $C_{20}H_{12}ClNO_3$ | 68.75 | 68.67 | 3.39 | 3.46 | 9.66 | 10.14 | 4.06 | 4.01 |
| VII | 4-$CH_3SPh$ | Ph | 127–129 | 74 | $C_{17}H_{12}ClNO_3S$ | 58.62 | 59.04 | 3.31 | 3.50 | 10.23 | 10.25 | 4.05 | 4.05 |
| VIII | 3-$CH_3$, 4$CH_3SPh$ | Ph | 134–136 | 75 | $C_{18}H_{14}ClNO_3S$ | 59.99 | 60.08 | 3.92 | 3.92 | 9.76 | 9.85 | 3.84 | 3.89 |
| IX | $PhCH_2$ | Ph | 113–115 | 41 | $C_{17}H_{12}ClNO_3$ | 64.76 | 65.08 | 3.87 | 3.86 | 11.29 | 11.30 | 4.47 | 4.47 |

EXAMPLE X

2,3-bis(4-chloro-2-methylphenoxy)-N-phenylmaleimide

To a stirred suspension of 3.82 g. of 57% sodium hydride oil dispersion (2.18 g. 0.091 mole) in 50 ml. of dioxane was added dropwise, over a period of 1¾ hours, 11.9 g. (0.084 mole) of 4-chloro-2-methylphenol in 100 ml. of dioxane. The slurry was stirred for 15 minutes and added rapidly to a stirred suspension of 10.0 g. (0.041 mole) of N-phenyldichloromaleimide in 100 ml. of dioxane. The mixture was stirred overnight, concentrated *in vacuo*, and diluted with water. The mixture was stirred until crystallization occurred, then filtered, and the solid washed with water. Recrystallization from 95% ethanol gave 9.35 g. of crude solid which was further recrystallized to give 7.68 g. of yellowish-green crystals having a melting point of 124–126° C.

The above compound which had a formula of $$C_{24}H_{17}Cl_2NO_4$$

was then analyzed as follows:

|  | Percent | | | |
|---|---|---|---|---|
|  | Carbon | Hydrogen | Chlorine | Nitrogen |
| Found | 63.68 | 3.78 | 14.44 | 3.13 |
| Calculated | 63.45 | 3.78 | 15.61 | 3.08 |

EXAMPLE XI

2,3-bis(4-nitrophenoxy)-N-phenylmaleimide

To a stirred suspension of 7.65 g. of 57% sodium hydride oil dispersion (4.36 g., 0.182 mole) in 100 ml. of dimethylsulfoxide was added dropwise 23.2 g. (0.167 mole) of 4-nitrophenol dissolved in 100 ml. of dimethylsulfoxide over a period of 1 hour and 35 minutes. The mixture was stirred for 15 minutes and added dropwise with stirring to a suspension of 20.0 g. (0.083 mole) of N-phenyldichloromaleimide in 100 ml. of dimethylsulfoxide, over a period of 1¾ hours. The mixture was stirred and then poured into ice water. The mixture was then further stirred for 20 minutes and filtered with suction. The damp solid was dried *in vacuo* to yield 35.5 g. of a dark yellow solid. Recrystallization from chloroform afforded 22.81 g. of tan crystals having a melting point of 203–205° C.

The above compound had a formula of $C_{22}H_{13}N_3O_8$ and analyzed as follows:

|  | Percent | | |
|---|---|---|---|
|  | Carbon | Hydrogen | Nitrogen |
| Found | 58.79 | 3.02 | 9.35 |
| Calculated | 59.07 | 2.93 | 9.39 |

A number of other maleimide derivatives were made according to the procedures of Example Nos. 10 and 11. These compounds have the following general structural formula:

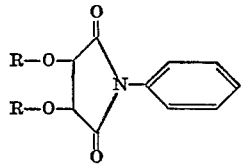

wherein R is selected from a group consisting of phenyl and substituted phenyl.

Application of the just described maleimide derivatives may be made employing the procedures normally used for treatment of the plant situs including dip or soak treatments of tubers, bulbs, or cuttings, for example, as well as foliar, bark or stem, or soil application. When the soil treatment method application is used, it is necessary to mix the active ingredient with the soil, place the active chemical in the root zone or otherwise provide for the plant roots to contact the chemical. Thus, the maleimide derivatives may be applied to any of the just-mentioned places, as well as any other application area of "situs" of the plant which will affect the plant so treated.

The active ingredient may be utilized in diverse formulations, including the adjuvants and carriers normally employed for facilitating the dispersion of active ingredients for agricultural applications, recognizing a known fact that the dosage, formulation, mode of application of a chemical agent and other variables may affect its activity in any given application. Thus, the just-described maleimide derivatives may be formulated as a solution or dispersion, in aqueous or non-aqueous media, as a powdery dust, as a wettable powder, as an emulsifiable concentrate, as a granule, or as any of several other known types of formulations, depending on the desired mode of application. These growth regulatory compositions may be applied as sprays, dips, dust, or granules to the plant situs in which growth regulation is desired. These formulations may contain as little as 0.0005% or as much as 95% or more by weight of active ingredient, and applications may be at rates equivalent to less than 2 to over 600 lbs./acre, depending upon the desired effect upon plants so treated.

In order to provide compositions in the form of dust, high-strength concentrates, granules, pellets, water-dispersible powders, aqueous solutions, dispersions, or emulsions and solutions or dispersions in organic liquids, the carrier or diluent agent in such formulations may be a finely divided solid, an organic liquid, water, a wetting agent, a dispersing agent, or emulsifying agent, or any suitable combination of these. Generally, when liquids and wettable powders are prepared a conditioning agent comprising one or more surface-active agents or surfactants is present in amounts sufficient to render a given composition containing the active compounds readily dispersible in water or in oil.

The surface active agent used in the invention here can be a wetting, dispersing or emulsifying agent which will assist dispersion of the compound. The surface-active agent or surfactant can include such anionic, cationic and non-ionic agents as have heretofore been generally employed in plant control compositions of similar type. Suitable surface-active agents are set forth, for example, in "Detergents and Emulsifiers" 1971 Annula by John W. McCutcheon, Inc.

In general less than 10% by weight of the surface-active agent will be used in compositions of this invention, and ordinarily the amount of surface-active agent will range from 1–5% but may even be less than 1% by weight.

Additional surface-active agents can be added to the formulations to increase the ratio of surfactant:active ingredient up to as high as 5:1 by weight. Such compositions may have a greater biological effectiveness than can be expected from a consideration of the activity of the

TABLE II

| Example number | R | M.P. °C. | Percent yield | Formula | Percent | | | | | | | |
|---|---|---|---|---|---|---|---|---|---|---|---|---|
|  |  |  |  |  | Carbon | | Hydrogen | | Chlorine | | Nitrogen | |
|  |  |  |  |  | Found | Calcd. | Found | Calcd. | Found | Calcd. | Found | Calcd. |
| XII | Ph | 164–166 | 40 | $C_{22}H_{15}NO_4$ | 74.07 | 73.94 | 4.24 | 4.23 |  |  | 4.08 | 3.92 |
| XIII | 4-ClPh | 214–216 | 63 | $C_{22}H_{13}Cl_2NO_4$ | 62.46 | 61.99 | 3.08 | 3.07 | 16.12 | 16.64 | 3.36 | 3.29 |
| XIV | 3-ClPh | 132–134 | 41 | $C_{22}H_{13}Cl_2NO_4$ | 62.15 | 61.99 | 3.01 | 3.07 | 16.67 | 16.64 | 3.34 | 3.29 |
| XV | 4-CH₃SPh | 163–166 | 65 | $C_{24}H_{19}NO_4S_2$ | 63.80 | 64.12 | 4.27 | 4.26 |  |  | 3.02 | 3.12 |
| XVI | 3-CH₃, 4-CH₃SPh | 177–179 | 62 | $C_{26}H_{23}NO_4S_2$ | 65.08 | 65.38 | 4.77 | 4.85 |  |  | 2.89 | 2.93 | components used separately. When used at higher rates, it is preferred that the surfactant be present in the arnge of one-fifth to five parts surfactant for each one part of active agent.

Wettable powders: Wettable powders are water-dispersible compositions containing the active mtaerial, an inert solid extender, and one of more surfactants to provide rapid wetting and prevent heavy flocculation when suspended in water.

The inert extenders which are preferred for use in the wettable powders of this invention containing the active compounds are of mineral origin.

The classes of extenders suitable for the wettable powder formulations of this invention are the natural clays, diatomaceous earth, and synthetic mineral fillers derived from silica and silicate. Most preferred fillers for this invention are kaolinites, attapulgite clay, montmorillonite clays, synthetic silicas, synthetic magnesium silicate and calcium sulfate dihydrate.

Among the more preferred surfactants are the non-ionic and anionic types, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene and alkylnaphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, lignin sulfonates, polymeric alkylnaphthalene sulfonates, sodium naphthalene sulfonates, polymethylene bis-napthalene sulfonate, and sodium-N-methyl-N-(long chain acid) taurates.

Wetting and dispersing agents in these preferred wettable powder compositions of the invention are usually present at concentrations of from about 0.5 weight percent to 5 weight percent. The inert extender than completed the formulation. Where needed, 0.1 weight percent to 1.0 weight percent of the extender may be replaced by a corrosion inhibitor or an anti-foaming agent or both.

Thus, wettable powder formulations of the invention will contain from about 25 to 90 weight percent active material, from 0.5 to 2.0 percent wetting agent, from 0.25 to 5.0 weight percent dispersant, and from 9.25 to 74.25 weight percent inert extender, as these terms are described above.

When the wettable powder contains a corrosion inhibitor or an anti-foaming agent or both, the corrosion inhibitor will not exceed about 1 percent of the composition, and the anti-foaming agent will not exceed 0.5 percent by weight of the composition, both replacing equivalent amounts of the inert extender.

High-strength compositions and aqueous suspension concentrates: High-strength compositions generally consist of 90 to 99.5 percent active ingredient and 0.5 to 10 percent of a liquid or solid surfactant such as those described in "Detergents and Emulsifiers" 1971 Annual by John W. McCutcheon, Inc. Such high-strength compositions can often be used in a manner similar to the wettable powders but they are also suitable for further formulation.

The aqueous suspension concentrates are prepared by mixing together and sand grinding an aqueous slurry of water-insoluble active ingredient in the presence of dispersing agents until a concentrated aqueous slurry is obtained in which the particles of active ingredient are substantially all below 5 microns in size. This concentrated aqueous suspension is characterized by its extremely small particle size so that upon diluting and spraying, a very uniform coverage is obtained.

These just-described aqueous suspension concentrates will contain from 15 to 40% of active ingredient, from 45 to 70% water, with the remainder made up of surfactants, corrosion inhibitors and suspending agents.

Suspensions in organic liquids can be prepared in a similar manner such as by replacing the water with mineral oil.

Dusts: Dusts are dense powder compositions which are intended for application in dry form. Dusts are characterized by their free-flowing and rapid settling properties so that they are not readily windborn to areas where their presence is not desired. They contain primarily an active ingredient and a dense, free-flowing, solid extender. Their performance is sometimes aided by the inclusion of a wetting agent, and convenience in manufacture frequently demands the inclusion of an inert absorptive grinding aid.

The wettable powder as described above can also be used in the preparation of dusts. While such wettable powders can be used directly in dust form, it is more advantageous to dilute them by blending with the dense dust diluent. In this manner, dispersing agents, corrosion inhibitors, and antifoam agents may also be found as component of a dust.

Thus, the dust compositions of this invention will comprise from about 5 to 20 weight percent active ingredient, 5 to 25 weight percent filler, 0 to 1.0 weight percent wetting agent and from about 30 to 90 weight percent dense, free-flowing extender, as these terms are used herein. Such dust formulations can contain, in addition, minor amounts of dispersants, corrosion inhibitors, and anti-foam agents derived from the wettable powders used to make the dust.

Emulsifiable oils: Emulsifiable oils are usually solutions of active material in non-water miscible solvents together with a surfactant.

For the compounds of this invention, emulsifiable oils can be made by mixing the active ingredient with a solvent and surfactant. Suitable solvents for the compound of this invention are chlorinated solvents, non-water miscible ethers, esters, or ketones alone or in admixture with aromatic hydrocarbons. Suitable surfactants are those ionic or non-ionic agents known to the art as emulsifying agents.

Emulsifying agents most suitable for the emulsifiable oil compositions of this invention are long-chain alkyl or mercaptan polyethoxy alcohols, alkylaryl polyethoxy alcohols, sorbitan fatty acid esters, polyoxyethylene ethers with sorbitan fatty esters, polyethylene glycol esters with fatty rosin acids, fatty alkylol amide condensates, calcium and amine salts of fatty alcohol sulfates, oil soluble petroleum sulfonates or, preferably mixtures of these emulsifying agents. Such emulsifying agents will comprise from about 1 to 10 weight percent of the total composition. As described above, however, up to 5 parts of emulsifying agent for each part of active ingredient can be used.

Thus, emulsifiable oil compositions of the present invention will consist of from about 10 to 50 weight percent active ingredient, about 40 to 82% solvents, and about 1 to 10 weight percent emulsifier, as these terms are defined and used above.

In some instances the oil solution may be intended merely for extention with other oils, and in this instance, the emulsifying agent may be omitted and may be replaced by additional solvent.

Granules and pellets: Granules and pellets are physically stable, particulate compositions containing a compound of this invention which adheres to or is distributed through a basic matrix of a coherent, inert carrier with microscopic dimensions. In order to aid leaching of the active ingredient from the granule or pellet, a surfactant can be present.

The inert carrier is preferably of mineral origin, and suitable carriers are natural clays, some pyrophyllites and vermiculite. Suitable setting agents are anionic or non-ionic.

For the granule compositions of this invention, most suitable carriers are of two types. The first are porous, absorptive pre-formed granules, such as pre-formed and screened granular attapulgite or heat expanded, granular, screened vermiculite. On either of these, a solution of the active agent can be sprayed and will be absorbed at concentrations up to 25 weight percent of the total weight. The second, which are also suitable for pellets, are initially powdered kaolin clays hydrated attapulgite or bentonite clays in the form of sodium, calcium, or magnesium bentonites. Water-soluble salts such as sodium salts may also be present to aid in the disintegration of the granules or pellets in the presence of moisture. These ingredients are blended with the active components to give mixtures that are granulated or pelleted, followed by drying to yield formulations with the active component distributed uniformly throughout the mass. Such granules or pellets can also be made with 25 to 30 weight percent active component but more frequently a concentration of about 10 weight percent is desired for optimum distribution. The granular compositions of this invention are most useful in a size range of 15–30 mesh.

The most suitable wetting agent for the granular compositions of this invention depend upon the type of granule used. When pre-formed granules are sprayed with active material in liquid form, the most suitable wetting agents are non-ionic, liquid wetters miscible with the solvent. These are, more generally known to the art as emulsifiers and comprise alkylaryl polyether alcohols, alkyl polyether alcohols, polyoxyethylene sorbitan fatty acid esters, polyethylene glycol esters with fatty or rosin acids, fatty alkylol amide condensates, oil soluble petroleum or vegetable oil sulfonates, or mixtures of these. Such agents will usually comprise up to about 5 weight percent of the total composition.

When the active ingredient is first mixed with a powdered carrier and subsequently granulated, or pelleted, liquid non-ionic wetters can still be used, but it is usually preferably to incorporate at the mixing stage one of the solid, powdered anionic wetting agents such as those previously listed for the wettable powders. Such agents will comprise from about 0 to 2 weight percent of the total composition.

Thus, the preferred granular pelleted formulations of this invention comprise about 5 to 30 weight percent active material, about 0 to 5 weight percent wetting agent, and about 65 to 95 weight percent inert mineral carrier, as these terms are used herein.

Aqueous solutions: Certain compounds of this invention are soluble in mild acid or alkaline solutions and can be formulated and applied in aqueous solution in concentrations up to about 20%.

The active agents of the invention in formulations as just described may also contain a wide variety of other active ingredients necessary to carry out other aims as desired. For example, they may contain algaecides, including quaternary ammonium salts, and copper sulfate; bactericides including quaternary ammonium salts and n-chlorosuccinimide; blossom thinners, including phenols; defoliants, including phosphorotrithioates and chlorates; fumigants, including dithiocarbonates, cyanides and halogenated ethanes; fungicides including lime, sulfur, thiodiazines, phthalimides, sulfonamides, disulfides, benzoquinones, mercuric compounds, arsenates, cupric compounds, guanide salts, triazines, and phenylcrotonates; germicides including quaternary ammonium salts, phenolics, quaternary pyridinium salts, peracids, and formaldehyde; herbicides, including sulfamates, borates, alpha haloacetamides, carbamates, substituted phenoxy acids, substituted benzoic acids, halogenated aliphatic acids and salts, substituted phenols, substituted ureas, phthalates, dithiocarbamates, thiolcarbamates, disulfides, chlorates, cyanates, xanthates, allyl alcohol, hexachloracetone, maleic hydrazide and phenyl mercuric acetate; insecticides including natural products such as pyrethrin, aresenicals and arsenites, benzoates, chlorinated hydrocarbons, phosphates, thiophosphates, phosphonates, thiazines, carbamates, terpenes, tartrates, and pyrrolidines; miticides including sulfonates, sulfites, sulfides, substituted phenols and salts, phosphonates, oxalates, sulphones, and strychinine; menatocides, including halogenated propanes and propenes, dithiocarbamates, and methyl bromide; insect repellents including succinates, furfurals, ethylhexanediol and butyl mesityl oxide; and rodenticides including coumarins, phosphorous, red squill, fluorides, and arsenites.

The above described plant regulators may be used to both beneficiate plants and eradicate them. The destruction or beneficiation of the plants will be dependant, of course, upon the particular formulation, plant treated, dosage treatment, and other factors. In some instances growth will be retarded. In other instances complete kill will be achieved.

It has been found here that the described compounds are active as herbicides to control and inhibit undesirable weed growth. The compounds may be used in the agricultural, industrial and domestic fields and may be used to subject roadsides, embankments and other surfaces to treatment. The compounds are effective in inhibiting or destroying a wide variety of grasses and weeds such as Johnson grass, bindweed, water grass, orchard grass, smooth crabgrass, dwarf pea, soybean, quack grass, wheat, snapbean, nut grass, hairy crabgrass, curly dock, etc.

Representative compounds of the invention were then tested for their herbicidal activity by treating a wide variety of plant species.

Specifically, a 5,000 p.p.m. stock was prepared by solubilizing 800 mg. of the test compound in 4 ml. of dimethylformamide. After obtaining the dimethylformamide solution or suspension, 12 ml. of an alcoholic-surfactant mixture was added to end with a total of 16 ml. solution or suspension of the proper concentration. The active herbicidal ingredient is then present at a 5% concentration. Thus, the surfactant to active ratio is 0.51 v./w. which remains constant. The final solution used in screening the herbicides for activity is made by adding 8 ml. of the above stock solution to 32 ml. of a 50:50 mixture of acetone and deionized water. The final percentages of solvents and adjuvants are 5% dimethylformamide, 14.5% isopropyl alcohol, 40% water, 40% acetone, and 0.5% surfactant. A typical surfactant used here is the commercially available Tween 20.

The active compounds described here are adjusted for both pre-emergence and post-emergence activity. The pre-emergence treatment and post-emergence treatment dosages were both 10 lbs./acre. In the pre-emergence test the soil was sprayed immediately after the seeds of the test plants were planted. The post-emergence treatment involved spraying the already grown plants. The compounds were then rated for herbicidal response on a scale ranging from 0 to 10. A rating of 0 indicates no visible response; a rating of 10 is a maximum response and a rating of 1–9 indicates degrees of visible response between the two extremes.

The following codes indicate how the plants responded to treatment. A code rating of A indicates that the growth was accelerated, and there was an increase in height of the plant over the control.

A rating of B indicates burn or contact injury. Essentially, this indicates an acute response occurring within 72 hours after treatment. A 5 rating indicates that the plant was half dead and a 10 indicates complete kill.

A code of C indicates chlorosis. 1–3 indicates increasing degrees of chlorosis. 4–8 indicates increasing amounts of necrosis. A rating of 9 with this code C indicates all the tissues are dead except for part of the stem. C10 indicates that plant was completely dead.

A code of D indicates defoliation. A rating of 5 for example, indicates that half the leaves had fallen.

A rating of E indicates that emergence was inhibited. A rating of 5 then would mean that only half the seedlings emerged.

A rating of F indicates earlier flowering. The numerical ratings along with the plant response key F would express relative degrees of activity.

The plant response key G indicates that growth was retarded. A rating of 5 would mean that the plants were half the size of the controls. This response was used to point out compounds that retard growth with minimum visual damage to the plant, e.g. compounds that burn the plant foliage with subsequent retarded growth would be classified with B rating.

A code rating of H indicates a hormone effect. The hormone effects include epinasty, faciation, etc. The numerical rating indicates the degree of activity.

The code rating J indicates albinism to necrosis to death. Thus, 1–3 indicates an increasing degree of albinism. 4–8 indicates an increasing amount of necrosis. A rating of 9 with the code J indicates that all the tissue is dead except part of the stem and a rating of 10 indicates that the plant was completely dead.

The code K is an indication of axillary stimulation. This indicates axillary bud growth on broad leaves and tillering on grasses.

The code L is an indication of leaf malformation not of the hormonal type. P is used to indicate unusual pigmentation. The code S indicates true abscission.

The code letter T indicates selective burning of active growing tissue i.e. growing tips, axillary buds, etc. This burning also causes loss of apical dominance in many cases.

Lastly, the code Y indicates a delay of emergence. The days of delay over control would determine the numerical rating given along with the code letter Y.

The compounds of the invention were then tested and rated according to procedures described above. The compounds were tested utilizing a wide variety of test plants, and it can be seen from the results below that the compounds of the invention show versatility in their herbical activity. In the results listed below the compound number refers to the same example number. Thus, for example, compound No. 1 is the compound of example number 1 and so forth.

TABLE III.—2-CHLORO-3-PHENOXYMALEIMIDE

Post-emergence

| | |
|---|---|
| Johnson grass | 1C |
| Bind weed | 3C |
| Water grass | 1C |
| Soy bean | 10C |
| Snap bean | 1H, 10T |
| Cotton | 2H, 8C |
| Common foxtail | 1C |

TABLE IV.—2-CHLORO-3-METHOXYMALEIMIDE

Post-emergence

| | |
|---|---|
| Bind weed | 5C |
| Orchard grass | 5G |
| Soy bean | 2C |
| Snap bean | 4T |

TABLE V.—COMPOUND NO. IV

Post-emergence

| | |
|---|---|
| Cotton | 7C |

TABLE VI.—COMPOUND NO. II

Pre-emergence

| | |
|---|---|
| Quack grass | 5G |
| Snap bean | 2H |
| Cotton | 7E |
| Wild oats | 5G, 2C |
| Curly dock | 7E |

TABLE VII.—COMPOUND NO. V

Pre-emergence

| | |
|---|---|
| Bind weed | 5G |

What is claimed is:

1. A maleimide derivative of the formula:

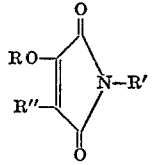

where R is selected from the group consisting of alkyl containing 1–10 carbon atoms, benzyl, naphthyl, phenyl, and substituted phenyl, wherein said phenyl substituent is selected from the group consisting of halo, loweralkylthio, loweralkyl, and nitro, R' is selected from the group consisting of hydrogen, and phenyl and R" is selected from the group consisting of halo and RO.

2. A maleimide of the formula:

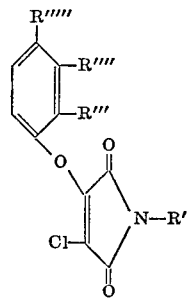

where R' is selected from the group consisting of hydrogen, and phenyl, R''' is selected from the group consisting of hydrogen, halo and loweralkyl and R''''' is selected from the group consisting of hydrogen, halo, lower alkylthio, and nitro.

3. A maleimide derivative of the formula:

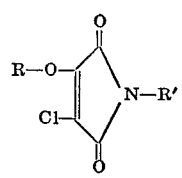

wherein R is selected from the group consisting of alkyl containing 1–10 carbon atoms, naphthyl, phenyl, substituted phenyl wherein said phenyl substituent is selected from the group consisting of halo, loweralkylthio, loweralkyl and nitro, and benzyl, and R' is selected from the group consisting of hydrogen, and phenyl.

4. The compound of claim 3 wherein R is phenyl and R' is hydrogen.

5. The compound of claim 3 wherein R is methyl and R' is hydrogen.

6. The compound of claim 3 where R and R' are phenyl.

7. The compound of claim 3 wherein R is 4-chlorophenyl and R' is phenyl.

8. The compound of claim 3 wherein R is 3-chlorophenyl and R' is phenyl.

9. The compound of claim 3 wherein R is beta-naphthyl and R' is phenyl.

10. The compound of claim 3 wherein R is 2,4-dichlorophenyl and R' is phenyl.

11. The compound of claim 3 wherein R is 4-methylthiophenyl and R' is phenyl.

12. The compound of claim 3 wherein R is 3-methyl, 4-methylthiophenyl and R' is phenyl.

13. The compound of claim 3 wherein R is benzyl and R' is phenyl.

14. The compound of the formula:

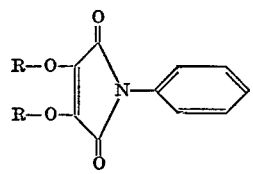

wherein R is selected from the group consisting of phenyl and substituted phenyl, wherein said phenyl substituent is selected from the group consisting of halo, loweralkylthio, loweralkyl and nitro.

15. The compound of claim 14 where R is phenyl.
16. The compound of claim 14 where R is 2-methyl, 4-chlorophenyl.
17. The compound of claim 14 wherein R is 4-chlorophenyl.
18. The compound of claim 14 where R is 3-chlorophenyl.
19. The compound of claim 14 where R is 4-methylthiophenyl.
20. The compound of claim 14 where R is 3-methyl, 4-methylthiophenyl.
21. The compound of claim 14 where R is 4-nitrophenyl.

References Cited
UNITED STATES PATENTS 3,129,225   4/1964   Shapiro et al. _____ 260—247.2

JOSEPH A. NARCAVAGE, Primary Examiner

U.S. Cl. X.R.

71—95; 260—326.5 S

UNITED STATES PATENT OFFICE
CERTIFICATE OF CORRECTION

Patent No. 3,816,451  Dated June 11, 1974

Inventor(s) Aldo Joseph Crovetti and Donald Murl Lynch

It is certified that error appears in the above-identified patent and that said Letters Patent are hereby corrected as shown below:

In Column 3 line 18, please add the following sentence.

"The following examples illustrate typical compounds of the invention and their method of preparation."

Signed and sealed this 10th day of December 1974.

(SEAL)
Attest:

McCOY M. GIBSON JR.
Attesting Officer

C. MARSHALL DANN
Commissioner of Patents